United States Patent [19]

Rasmussen et al.

[11] Patent Number: 4,460,200
[45] Date of Patent: Jul. 17, 1984

[54] HYDRAULIC CHUCK WITH IMPROVED SEAL

[75] Inventors: Robert F. Rasmussen, Minneapolis; George R. Smida, Crystal; Robert L. Wietecha, Columbia Heights; Gary L. Pearson, Minneapolis, all of Minn.

[73] Assignee: Air-Mo Hydraulics, Inc., Minneapolis, Minn.

[21] Appl. No.: 277,205

[22] Filed: Jun. 25, 1981

[51] Int. Cl.³ .............................................. F16L 21/06
[52] U.S. Cl. ........................................ 285/18; 279/4; 285/323
[58] Field of Search ................. 285/18, 322, 323, 104, 285/105; 279/4, 1 Q

[56] References Cited

U.S. PATENT DOCUMENTS 3,608,932  9/1971  Brown ..................... 285/18
4,189,162  2/1980  Rasmussen et al. ............. 279/4

FOREIGN PATENT DOCUMENTS 1182887  1/1959  France ..................... 279/4
2043814  10/1980  United Kingdom ............. 285/322

*Primary Examiner*—Thomas F. Callaghan
*Attorney, Agent, or Firm*—John S. Munday

[57] ABSTRACT

A hydraulic chuck haging a piston means with an axially centered fluid passage and a tube seating means on one end thereof. Collet means are provided and are mounted on the piston means such that axial movement of the piston means operates the collet means. The chuck body is slideably mounted on the piston means and has a nose cone means fixedly mounted on the body means. The nose cone means includes a collet engaging surface to close the collet upon engagement of the surface and the collet means. Seal means for preventing passage of fluid between the tube and the collet means are provided and include a seal cartridge means adjacent to tube seating means on the piston means. Seal seat means are slideably contacting the cartridge means and keyed to the collet means to define a seal cavity between the seal seat and the seal cartridge. The cavity has a first size when the collets are open and a smaller second size when the collets are closed. Finally, o-ring seal means are positioned in the cavity, having a larger cross section than the cavity when the collets are closed. The o-ring seal means may be constructed so as to have an uncompressed inner diameter greater than the diameter of the tube which fits the chuck device. In addition, the o-ring seal means may have an outer diameter slightly larger than the maximum diameter of the cavity so as to keep the o-ring out of contact with the tube when the collets are open. The device may further include pneumatic means on said body means to move the body with respect to the piston to close the collet without the presence of fluid in the fluid passage, whereby the device grips the tube and activates the o-ring seal prior to presence of fluid in the passage.

2 Claims, 1 Drawing Figure

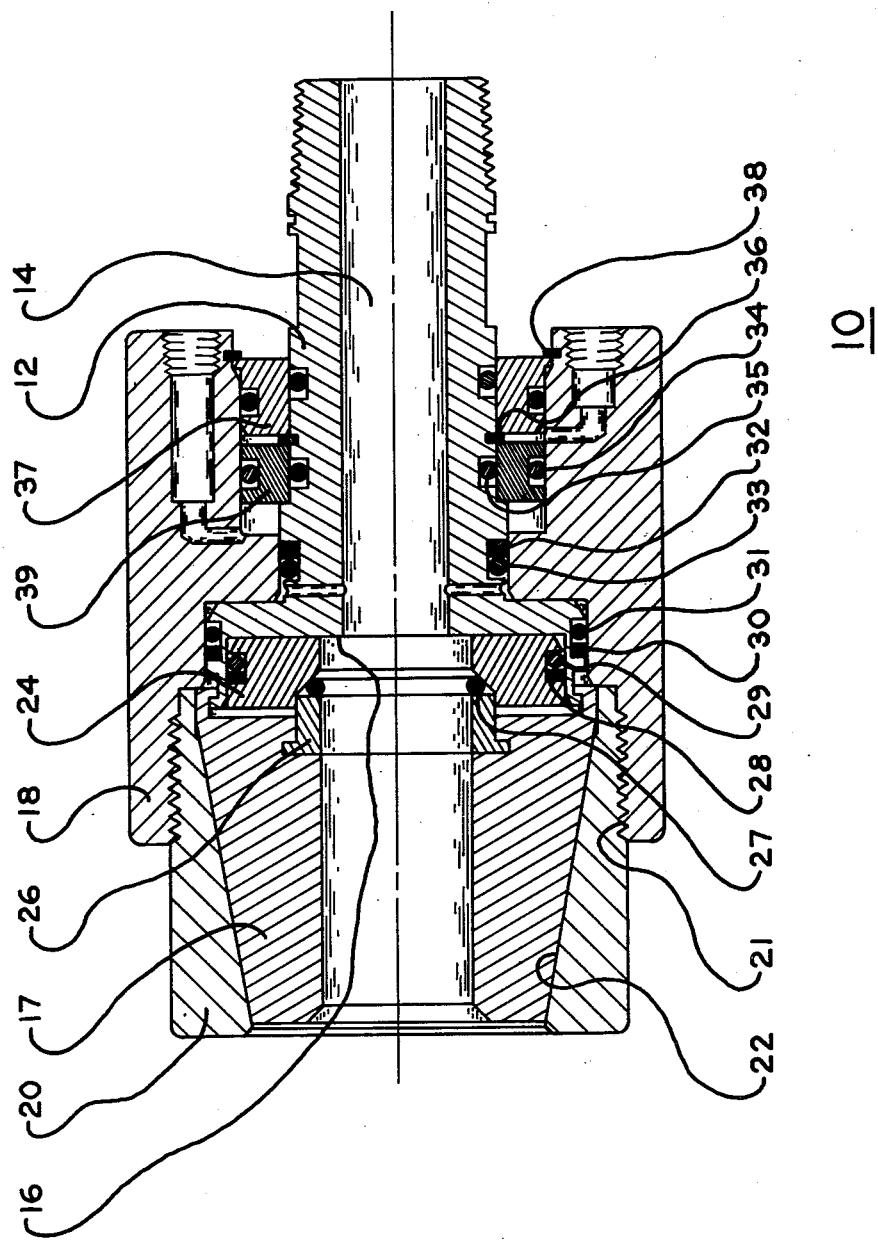

HYDRAULIC CHUCK WITH IMPROVED SEAL

BACKGROUND OF THE INVENTION

Fluid pressure operated devices for radially expanding portions of tubing are know, such devices being disclosed in U.S. Pat. Nos. 1,448,457; 2,479,702; 2,938,562; and 3,200,627. Structures of these patents include fluid conveying mandrels to hold the tubing, and die elements against which portions of the tubing are flared or otherwise formed by fluid pressure. The expanding devices are customarily used to provide short bulges in tubing for coupling purposes and the like. In addition, they are used to expand tubing to fit fins and other apparatus connected to the outer surface of the tubing.

Several hydraulic chucks have been developed which are suitable for tightly gripped one end of the elongated tube while simultaneously delivering a tube expanding fluid. Among these are U.S. Pat. Nos. 3,505,846; 3,813,751; and 3,962,769.

One of the problems which continuously plague those users of hydraulic chucks is the failure of seals after only a few operations of the hydraulic chuck. Various means have been developed to allow the user to temporarily connect a fluid system to a conductor such as in the process for hydrostatic testing of pipe, or in the placements of fins on air-conditioning tubing. All of these means use conventional, fixed, elastomeric seals to seal the connector or hydraulic chuck to the conductor or tube. While this results in an initially workable seal, it is often extremely shortlived due to damage inflicted by the rough end of the tube when the chuck is installed on the tubing. When the tubing is tested or is expanded for other purposes, the pressure within the system is oftentimes quite high. Thus, the seals are necessary to prevent passage of fluid into areas which would cause leaks, and more importantly the pressure must be maintained to accomplish its objectives.

Accordingly, it is an object of this invention to provide a tube engaging chuck which is capable of maintaining adequate sealing through repetitive uses. Another object of this invention is to provide a chuck which can readily grip the tube to be expanded, permitting preloading of the tube prior to the expansion. This is a particular advantage in complicated assemblies where a large tube or a multiplicity of tubes are being expanded in an apparatus wherein the relationship spacially of one tube to another is critical. By being able to preload the tubes with fluid, it is possible to rearrange and restructure the relative relationships of the tubes immediately prior to expansion without any surge occuring from the addition of fluid to the tubes themselves.

U.S. Pat. No. 4,189,162 discloses a hydraulic chuck in which special sealing means are employed using a radially inward extending first portion of an elastomer having a particular hardness and a radially outward extending second portion whereby the seal accomodates the insertion of a tube and is compressed to expand and seal the tube by operation of the hydraulic chuck.

SUMMARY OF THE INVENTION

The present invention relates to a hydraulic chuck comprising a plurality of parts in interworking relationship which accomplish the above described objects. Specifically, a piston means is provided having an axially centered passage, and a tube seating means on one end thereof. Collet means are provided which are mounted on the piston means, such that axial movement of the piston means operates the collet means. A chuck body means is slideably mounted on the piston means and has a nose cone means fixedly mounted on the body means. The nose cone means is fixedly mounted on the body means. The nose cone means include a collet engaging surface positioned to close the collets upon engagement of the surface and the collet means.

Seal means are further provided in the device of the present invention for preventing passage of fluid between the tube and the collet means. The seal means include a seal cartridge means adjacent to the tube seating means on the piston means. The seal seat means are positioned in slideable contact with the cartridge means and are keyed to the collet means to define a seal cavity between the seat and the cartridge. The seal cavity has a first size when said collets are open and a smaller second size when said collets are closed. O-ring seal means are positioned in the cavity such that the o-ring has a larger cross section than the cavity when the collets are closed.

In a preferred embodiment, the o-ring seal means will have an uncompressed inner diameter greater than the diameter of the tube. The inner diameter is greater than the tube, the tube may be inserted and removed without contact between the tube and the o-ring so as to prevent any damage to the o-ring seal. Of course, when the cavity is moved to its small position, when the collets are in a closed position, the o-ring will be distorted since it has a larger cross section than the cavity at this position and the seal will then grip the tube to prevent passage of fluid between the seal and the tube. To further maintain the o-ring in a position away from the tube during insertion and removal of the tube, the o-ring may be sized to have an outer diameter slightly greater than the maximum of the seal cavity when the collets are open. This slightly larger diameter will cause the o-ring to be positioned as far as possible from the tube until the seal cavity is decreased in size to compress the o-ring.

The device of the present invention further includes a pneumatic means on the body means to move the body with respect to the piston to close the collets without the presence of fluid in the fluid passage, by this feature, it is possible for the collets to grip the tube and activate the o-ring seal prior to the presence of fluid in the passage, to ensure a perfect seal each time the device is used. Of course, when the collets are open, and the o-ring is not under any compression, it is readily apparent that the seal can easily be removed and replaced at a minimum of expense and labor.

DESCRIPTION OF THE DRAWINGS

For a more complete understanding of the invention, reference is hereby made to the drawings in which:

The view is a sectional view and side elevation of a chuck device of the present invention, with the section taken along the center axis of the chuck. The tube is not shown.

DETAILED DESCRIPTION OF THE INVENTION

Shown in the FIGURE, a tube may be positioned in the device shown generally by the reference numeral 10. A piston means 12 is provided with an axial central passage 14 and has a tube seating means 16 at one end thereof. Collet means 17 are mounted on the piston means 12 so that movement of the piston means 12 in an axial direction will cause movement of the collet means 17. Body 18 is slideably mounted on the piston means 12 and has a nose cone 20 fixedly mounted on the body 15 via threads 21. Threads 21 permit removal of the body and nose cone to allow for repair or change in size of the internal parts of the chuck. Nose cone 20 invludes a collet engaging surface 22 which is positioned to close the collet 1 upon engagement of the surface 22 and the collet 17 by axial movement of the piston 12 with respect to the body 18.

The sealing means provided according to the present invention for prevention of passage of fluid between the tube and the collet means 17 includes a seal cartridge means 24 which is adjacent the tube seating means 16 on the piston means 12. A seal seat means 26 is slideably contacting the cartridge means 24 and keyed to the collet means 17 to define a seal cavity between the seat 26 and the cartridge 12. Keying between collets keeps collets 17 aligned and asures retraction or the seat 26, thereby opening the seal. The cavity defined by the seat 26 and cartridge 24 is a first size when the collets 17 are open and a smaller second size when the collets 17 are closed by force of the surface 22 as previously described. Positioned within the cavity is an o-ring seal means 27 has a larger cross section than the cavity when the collets are closed.

The o-ring 27 preferrably has an uncompressed inner diameter greater than the diameter of the tube and therefore greater than the diameter of the seal seat 26. This slightly larger inner diameter in an uncompressed condition permits insertion of the tube without contact between the tube and the o-ring seal 27. The o-ring seal 27 may also have an outer diameter slightly greater than the maximum diameter of the cavity defined between the cartridge 24 and the seal seat 26 whereas to position the o-ring out of contact with the tube when the collets are open. Of course, insertion of the o-ring 27 by placing the collets 17 in a closed position will cause the o-ring to compress inward toward the tube thereby preventing passage of fluid onward to the collets 17.

Backup ring 28 and o-ring 29 are provided between the seal cartridge 24 and the piston 12 to prevent passage of fluid between while permitting slideable action to activate the collets 17. Similarly, backup ring 30 and o-ring 31 prevent passage of fluid between body 18 and the piston 12 as do backup ring 32 and o-ring 33. O-rings 34 and 35 further prevent passage of fluid or air between the body 18, the piston 12, and air cylinder. Snap ring 36 locates the position of air piston 37 such that air may be employed to activate the air piston 39 caused relative movement of the piston 12 and the body 18 to thereby force the collets to a closed position without the presence of fluid in the central passage 14. Upon closure of the collets 17 by movement of the piston 12 and body 18, the seal cartridge 24 and seal seat 26 reduce the size of the cavity to compress the o-ring 27 to grip the tube and seal the tube prior to the presence of fluid in the pass age 14.

Thus it can be seen that the chuck of this invention has an improved seal which may be replaced readily and yet which is designed for long lasting life. It does not contact the tubes being used with the chuck device.

Having thus described the invention, what is claimed is:

1. A hydraulic chuck device for use with a tube, comprising:
    piston means having an axially centered fluid passage and a tube seating means on one end thereof;
    collet means mounted on said piston means, such that axial movement of said piston means operates said collet means;
    chuck body means slideably mounted on said piston means and having nose cone means fixedly mounted on said body means, said nose cone means including a collet engaging surface positioned to close said collets upon engagement of said surface and said collet means; and
    seal means for preventing passage of fluid between said tube and said collet means, including a seal cartridge means adjacent said tube seating means on said piston means, seal seat means slideably contacting said cartridge means and keyed to said collet means to define a seal cavity opening toward said tube and located between said seat and said cartridge and having a first size when said collets are open and a smaller second size when said collets are closed, and o-ring seal means having an uncompressed inner diameter greater than the diameter of said tube whereby said o-ring is out of contact with said tube when said cavity is in said first size.

2. The device of claim 1, which further includes pneumatic means on said body means to move said body with respect to said piston to close said collets without the presence of fluid in said fluid passage, thereby gripping said tube and activating said o-ring seal prior to presence of fluid in said passage.

* * * * *